United States Patent
Jiang (10) Patent No.: US 9,294,305 B2
(45) Date of Patent: Mar. 22, 2016

(54) METHOD FOR SENDING ETHERNET FRAMES IN ETHERNET TREE SERVICE AND PROVIDER EDGE DEVICE

(75) Inventor: Yuanlong Jiang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 65 days.

(21) Appl. No.: 13/566,661

(22) Filed: Aug. 3, 2012

(65) Prior Publication Data

US 2012/0300784 A1 Nov. 29, 2012

Related U.S. Application Data

(63) Continuation of application No. PCT/CN2010/080511, filed on Dec. 30, 2010.

(30) Foreign Application Priority Data

Feb. 27, 2010 (CN) .......................... 2010 1 0117187

(51) Int. Cl.
*H04L 12/28* (2006.01)
*H04L 12/46* (2006.01)
(Continued)

(52) U.S. Cl.
CPC .......... *H04L 12/4654* (2013.01); *H04L 12/462* (2013.01); *H04L 12/4658* (2013.01); *H04L 45/00* (2013.01); *H04L 49/15* (2013.01)

(58) Field of Classification Search
CPC ............ H04L 12/4604; H04L 12/4641; H04L 49/354; H04L 2012/5617
USPC ................................ 370/395, 395.1, 389, 351
See application file for complete search history.

(56) References Cited

U.S. PATENT DOCUMENTS 7,697,534 B1* 4/2010 Narayanan .......... H04L 12/4625
370/392
7,965,709 B2 6/2011 Du
(Continued)

FOREIGN PATENT DOCUMENTS

| CN | 101160832 A | 4/2008 |
| CN | 101282276 A | 10/2008 |
| WO | 2008/119300 A1 | 10/2008 |

OTHER PUBLICATIONS

A Framework for E-Tree Service over MPLS Network draft-key-l2vpn-etree-frwk-01.txt.*

(Continued)

*Primary Examiner* — Andrew Lai
*Assistant Examiner* — Zhiren Qin
(74) *Attorney, Agent, or Firm* — Brinks Gilson & Lione (57) ABSTRACT

The present disclosure relates to the field of network communication, and in particular, to a method for sending Ethernet frames in an Ethernet Tree service and a provider edge device. The method includes: receiving, by a VLAN bridge, Ethernet frames sent by a root node or a leaf node; importing, by the VLAN bridge, the Ethernet frames into a root VLAN or a leaf VLAN according to the type of the node sending the Ethernet frames, and sending the Ethernet frames to a same virtual switch instance VSI; and sending, by the VSI, the Ethernet frames to a corresponding remote PE device by a pseudowire. Using the solution provided in the embodiments of the present disclosure, a VLAN is associated with the type of the node sending the Ethernet frames, thereby achieving effective isolation between the E-Tree leaf nodes and ensuring the original scalability of VPLS.

24 Claims, 3 Drawing Sheets

(51) Int. Cl.
*H04L 12/701* (2013.01)
*H04L 12/933* (2013.01)

(56) References Cited

U.S. PATENT DOCUMENTS

| | | | | |
|---|---|---|---|---|
| 8,583,753 B1* | 11/2013 | Bhagwatula | ............ | H04L 67/16 709/208 |
| 2007/0097968 A1* | 5/2007 | Du | ............ | H04L 12/4666 370/389 |
| 2010/0074098 A1 | 3/2010 | Zeng et al. | | |
| 2011/0164617 A1* | 7/2011 | Yong | ............ | H04L 45/04 370/392 |
| 2012/0300784 A1* | 11/2012 | Jiang | ............ | H04L 12/462 370/395.53 |

OTHER PUBLICATIONS

Office Action issued in corresponding Australian Patent Application No. 2010347080, mailed Jul. 31, 2013, 3 pages.
International Search Report issued in corresponding PCT Application No. PCT/CN2010/080511; mailed Apr. 7, 2011.
"PBB-VPLS and Hub & Spoke Connectivity" Broadband Forum Core and IP/MPLS Working Group. Wim Hendrix- Alcatel-Lucent.
Anderson, L et al. "Framework for Layer 2 Virtual Private Networks (L2VPNs)" The Internet Society. Sep. 2006.
Sajassi, Ali et al. "VPLS Interoperability with CE Bridges draft-ietf-l2vpn-vpls-bridge-interop-04.txt" Internet Working Group. Nov. 2007.
Key, Raymond et al. "Extension to VPLS for E-Tree draft-key-l2vpn-etree-02.txt" Network Working Group. Jan. 22, 2010.
Key, Raymond et al. "A Framework for E-Tree Service over MPLS Network draft-key-l2vpn-etree-frwk-01.txt" Network Working Group. Jan. 22, 2010.
Delord, Simon et al. "Control Word Reserved Bit for Use in E-Tree draft-delord-pwe3-cw-bit-etree-02.txt." Network Working Group. Jan. 22, 2010.
Jiang, Y et al. "VPLS PE Model for E-Tree Support draft-jiang-l2vpn-vpls-pe-etree-02.txt" Network Working Group. Oct. 25, 2010.
"Ethernet Services Definitions—Phase 2" The Metro Ethernet Forum, Apr. 2008.
"Ethernet Services Attributes—Phase 2" The Metro Ethernet Forum, Oct. 27, 2009.
"IEEE Standard for Local and Metropolitan Area Networks—Virtual Bridge Local Area Networks" IEEE Computer Society. May 19, 2006.
IEEE Standard for Local and Metropolitan Area Networks—Virtual Bridge Local Area Networks—Amendment 4: Provider Bridges IEEE Computer Society. May 26, 2006.
Extended European Search Report issued in corresponding European Patent Application No. 10846387.8, mailed Jan. 24, 2013.
Written Opinion of the International Searching Authority issued in corresponding PCT Patent Application No. PCT/CN2010/080511, mailed Apr. 7, 2011.
Xie et al., "Traffic Engineering for Ethernet over SONET/SDH: Advances and Frontiers" IEEE Network May/Jun. 2009.
Search Report issued in corresponding Chinese Patent Application No. 2010101171875, dated Dec. 5, 2012.
Haddock, Stephen, "E-Tree Support in 802.1Q," Version 1, 802.1 Interim Meeting, Austin, Jan. 2010, 13 pages.
Haddock, Stephen, Untitled, IEEE 802.1Q, Jan. 2005, 1 page.

* cited by examiner

METHOD FOR SENDING ETHERNET FRAMES IN ETHERNET TREE SERVICE AND PROVIDER EDGE DEVICE

CROSS-REFERENCE TO RELATED APPLICATION

This application is a continuation of International Application No. PCT/CN2010/080511, filed on Dec. 30, 2010, which claims priority to Chinese Patent Application No. 201010117187.5, filed with the Chinese Patent Office on Feb. 27, 2010, both of which are incorporated by reference herein in their entireties.

FIELD

The present disclosure relates to the field of network communications, and in particular, to a method for sending Ethernet frames in an Ethernet Tree service and a provider edge device.

BACKGROUND

Ethernet Tree (E-Tree) service is defined in Metro Ethernet Forum (Metro Ethernet Forum, MEF) as an Ethernet virtual connection (Ethernet Virtual Connection, EVC) service. It has the following features:

One root (Root) node corresponds to multiple leaf (Leaf) nodes, and multiple root nodes may exist.

The Ethernet fames from a root node may be received by another root node or any leaf node, and the Ethernet frames from a leaf node may be received by any root node.

A leaf node cannot communicate with another leaf node and they need to be isolated.

The asymmetric virtual local area network (virtual local area network, VLAN) technology may implement E-Tree services in Ethernet. In the asymmetric VLAN technology, a root node and a leaf node access a switch in untagged mode by using a root port and a leaf port respectively; in the switch, a PVID and a member set (member set and untagged set) is configured for each access port, and an egress port set for forwarding is configured respectively. When Ethernet frames enter the switch from the port accessed by the leaf node, the Ethernet frames are tagged with the port VLAN identifier (Port VLAN ID, PVID) corresponding to a leaf VLAN, then forwarded to the port accessed by the root node, and finally transmitted to the root node. When the Ethernet frames enter the switch from the port accessed by the root node, the Ethernet frames are tagged with the PVID of the corresponding root VLAN, and then sent to all members in the member set, that is, all leaf nodes and root nodes except the root node itself. The technology can be further extended to a generic solution with a root VLAN and a leaf VLAN, that is, all leaf nodes reach the root nodes by a leaf VLAN, and all root nodes reach all leaf nodes and other root nodes by a root VLAN.

Virtual private local area network service (Virtual Private LAN Service, VPLS) is a technology for emulating the Ethernet LAN by using the wide area network (Wide Area Network, WAN) architecture. The VPLS is capable of providing multipoint-to-multipoint connection in a Multi Protocol Label Switching (Multi-Protocol Label Switch, MPLS) network. This facilitates users' access to the MPLS network from multiple geographically dispersed points, and helps users' access to each other, which is similar to accessing a LAN directly from these points. At present, core network commonly uses the Internet Protocol (Internet Protocol, IP)/MPLS technology. Therefore, the requirements on providing virtual Ethernet services by using the VPLS is increasing and the deployment has seen wide application.

In a traditional implementation of the architecture of a provider edge (Provider Edge, PE) device and E-Tree service in VPLS, multiple CE nodes access a customer virtual local area network (Customer Virtual Local Area Network, C-VLAN) bridge (performing C-VLAN encapsulation) by using an attachment circuit (Attachment Circuit, AC), the C-VLAN bridge attaches to a service virtual local area network (Service VLAN, S-VLAN) bridge (performing S-VLAN encapsulation), the S-VLAN bridge connects to a virtual switch instance (Virtual Switch Instance, VSI) of the VPLS by using a virtual Ethernet interface, and then connects to the VSIs of other PE devices each by an end-to-end PW. For example, Ethernet frames of a customer are imported from the AC to the C-VLAN bridge. The C-VLAN bridge tags the Ethernet frames with a C-VLAN identifier, and sends the Ethernet frames to the S-VLAN bridge by using a virtual interface. At the ingress of the S-VLAN bridge, the frames are further tagged with a S-VLAN identifier. If the frames belong to a specific VPLS instance, they arrive at the VSI through the virtual interface of an S-VLAN corresponding to the VPLS instance. In current MPLS/VPLS network, valid isolation between the E-Tree leaf nodes cannot be guaranteed.

In MPLS/VPLS network, the critical issues presented in the industry lie in how to realize a valid isolation between E-Tree leaf nodes and ensure the original scalability of the VPLS.

SUMMARY

Embodiments of the present disclosure are directed to providing a method for sending Ethernet frames in an Ethernet Tree service and a provider edge device for implementing a valid isolation between the E-Tree leaf nodes while ensuring the original scalability of the VPLS.

The objectives of the embodiments of the present disclosure are implemented by the following solutions:

A method for sending Ethernet frames in an Ethernet Tree service includes: receiving, by a VLAN bridge, Ethernet frames sent by a root node or a leaf node; importing, by the VLAN bridge, the Ethernet frames into a root VLAN or a leaf VLAN according to the type of the node sending the Ethernet frames, and sending the Ethernet frames to the same VSI, wherein the VSI is connected to the VLAN bridge by at least one root VLAN and at least one leaf VLAN; and sending, by the VSI, the Ethernet frames to a corresponding remote provider edge PE device by a pseudowire.

A PE device includes a VLAN bridge and a VSI; where the VLAN bridge is configured to receive Ethernet frames from a root node or a leaf node, and import the Ethernet frames into a root VLAN or a leaf VLAN according to the type of the node sending the Ethernet frames, and send the Ethernet frames to the same VSI; and the VSI, connected to the VLAN bridge by at least one root VLAN and at least one leaf VLAN, is configured to send the Ethernet frames to a remote PE device by a pseudowire.

With the solution provided in the embodiments of the present disclosure, a VLAN is associated with the type of a node sending Ethernet frames, a valid isolation between the E-Tree leaf nodes is accomplished, and the VSI is connected to the VLAN bridge by at least one root VLAN and at least one leaf VLAN. In this way, each E-Tree service needs only one VPLS instance, ensuring the original scalability of the VPLS.

BRIEF DESCRIPTION OF THE DRAWINGS

To make the solution provided in embodiments of the present disclosure or the prior art clearer, the accompanying drawings for illustrating the embodiments of the present disclosure or the prior art are briefly described below. Apparently, the accompanying drawings are exemplary only, and persons of ordinary skills in the art can derive other drawings from such accompanying drawings without any creative effort.

DETAILED DESCRIPTION OF THE EMBODIMENTS

Figure 1:
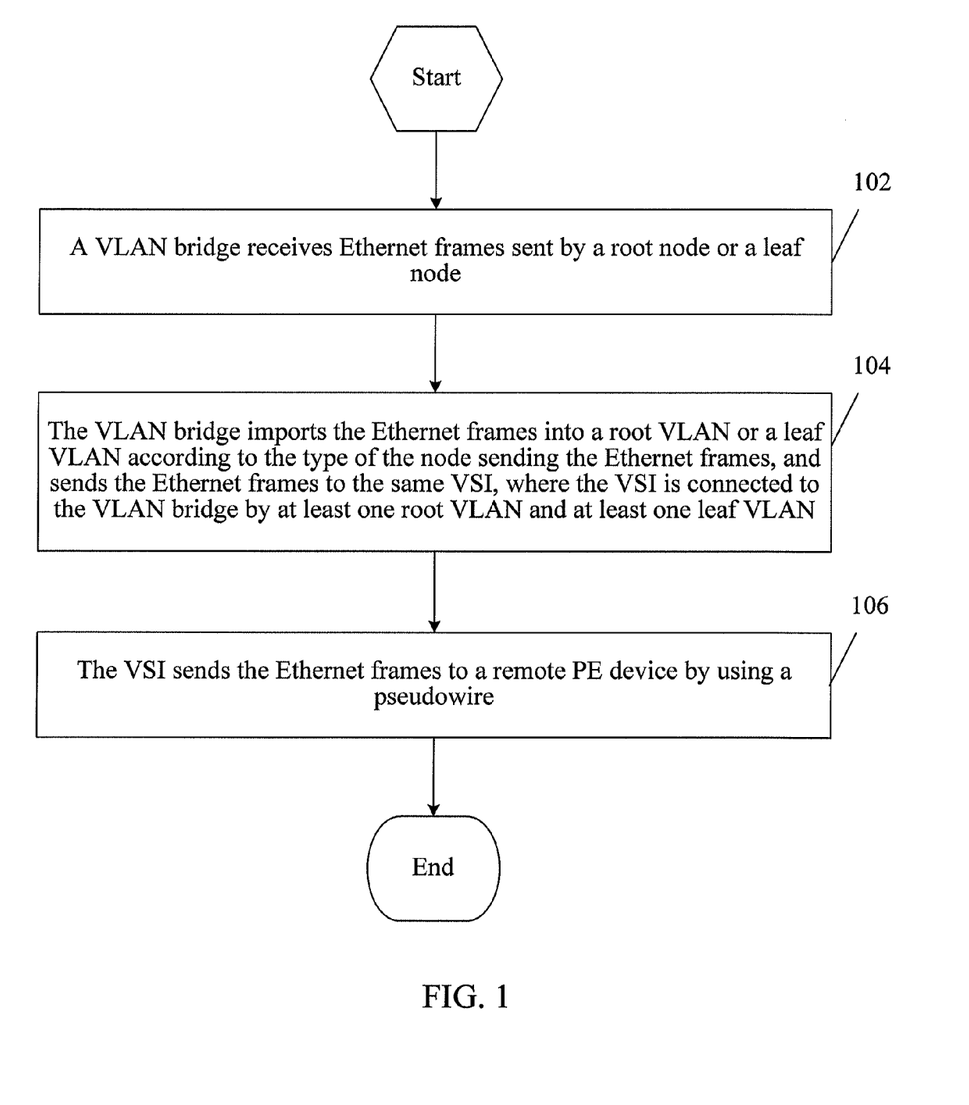
FIG. 1 is a flowchart of a method for sending Ethernet frames in an Ethernet Tree service according to an embodiment of the present disclosure.

The following describes an embodiment of the present disclosure with reference to FIG. 1.

FIG. 1 is a flowchart of a method for sending Ethernet frames in an Ethernet Tree service according to an embodiment of the present disclosure. The method includes:

102. A VLAN bridge receives Ethernet frames sent by a root node or a leaf node.

The VLAN bridge in a PE device receives the Ethernet frames from a customer edge (Customer Edge, CE) device. The Ethernet frames may carry tags or carry no tags. The CE device that sends the Ethernet frames may be a root node or a leaf node, and connected to the PE device by using an AC or a user network interface (User Network Interface, UNI). The PE device may determine the node type of the CE device that sends the Ethernet frames, according to the attribute of the UNI that receives the Ethernet frames and other conditions. The attribute, root or leaf, of an AC or a UNI is a configurable service attribute in E-Tree service.

104. The VLAN bridge imports the Ethernet frames into a root VLAN or a leaf VLAN according to the type of the node sending the Ethernet frames, and sends the Ethernet frames to a same VSI, where the VSI is connected to the VLAN bridge by at least one root VLAN and at least one leaf VLAN.

For example, when the type of the node is a leaf node, if the port corresponding to the AC connecting to the leaf node is in untagged mode or in priority tagged mode, the Ethernet frames received from or sent on the AC carry no tag or carry only priority tag. On the VLAN bridge port connected to the AC, a PVID is usually set to a value of the leaf VLAN. After entering the port, the Ethernet frames are tagged with a leaf VLAN identifier, that is, the Ethernet frames are imported into the leaf VLAN. The VLAN bridge port is meanwhile used as a member set (member set and untagged set) of the root VLAN. The Ethernet frames on the root VLAN which enter from other VLAN bridge ports are forwarded to the VLAN bridge port, the root VLAN tag is removed from the Ethernet frames, and then the Ethernet frames are sent out the port in untagged or priority tagged mode. If the port corresponding to the AC is in tagged mode, that is, the Ethernet frames carry a customer VLAN (C-VLAN) identifier, two translation tables, that is, an ingress translation table and an egress translation table, are configured on the port. When the Ethernet frames enter the port, an original customer VLAN is translated into the leaf VLAN; when the Ethernet frames leave the port, the Ethernet frames with the leaf VLAN are filtered and the root VLAN identifier of the Ethernet frames with the root VLAN is translated into the customer VLAN. In addition, when the port corresponding to the AC is in tagged mode, in addition to the C-VLAN identifier of the Ethernet frames, a leaf S-VLAN identifier may be further added, that is, the Ethernet frames are imported into the leaf S-VLAN.

For example, when the type of the node is a root node, if the port corresponding to the AC connecting to the root node is in untagged mode or in priority tagged mode, the Ethernet frames received from or sent on the AC carry no tag or carry only priority tag. On the VLAN bridge port connected to the AC, a PVID is usually set to a value of the root VLAN. After entering the port, the Ethernet frames are tagged with a root VLAN identifier, that is, the Ethernet frames are imported into the root VLAN. The VLAN bridge port is meanwhile used as a member set (member set and untagged set) of the root VLAN and leaf VLAN. The Ethernet frames on the root VLAN and leaf VLAN which enter from other VLAN bridge ports are forwarded to the VLAN bridge port, the VLAN tag is removed from the Ethernet frames, and then the Ethernet frames are sent out the port in untagged or priority tagged mode. If the port corresponding to the AC is in tagged mode, that is, the Ethernet frames carry a customer VLAN identifier, two translation tables, an ingress translation table and an egress translation table, are configured on the port. When the Ethernet frames enter the port, an original customer VLAN is translated into the root VLAN; when the Ethernet frames leave the port, the VLAN identifier of the Ethernet frames with the leaf VLAN or root VLAN which are received from other ports is translated into the customer VLAN. In addition, when the port corresponding to the AC is in tagged mode, in addition to the C-VLAN identifier of the Ethernet frames, a root S-VLAN identifier may be further added, that is, the Ethernet frames are imported into the root S-VLAN.

A PE device may include multiple VSIs, each supporting one or multiple E-Tree services. When one E-Tree service is supported by a VSI, the Ethernet frames sent by the root node or leaf node in the same E-Tree service are sent to the same VSI. When multiple E-Tree services access one VSI, the VLAN bridge may include multiple root VLANs and leaf VLANs, and the multiple root VLANs and leaf VLANs may access the VSI simultaneously.

The VLAN bridge of the PE device may be a single C-VLAN bridge or S-VLAN bridge, or may be a provider bridge (Provider Bridge, PB) composed of at least one C-VLAN bridge and at least one S-VLAN.

The C-VLAN bridge of the PE device tags the Ethernet frames sent by the root node with a root C-VLAN identifier, and imports the frames into the root C-VLAN; tags the Ethernet frames sent by the leaf node with a leaf C-VLAN identifier, and imports the frames into the leaf C-VLAN. The C-VLAN bridge sends the Ethernet frames in the E-Tree service to the S-VLAN bridge through the root C-VLAN or the leaf C-VLAN. The root C-VLAN identifier and the leaf C-VLAN identifier each may be a group of sequential numbers. The root C-VLAN identifier or the leaf C-VLAN identifier is not overlapped. To be more specific, a C-VLAN identifier may not be both the root C-VLAN identifier and the leaf C-VLAN identifier.

The S-VLAN bridge of the PE device tags the Ethernet frames from the root C-VLAN with a root S-VLAN identifier and imports the frames into the S-VLAN; and tags the Ethernet frames from the leaf C-VLAN with a leaf S-VLAN identifier and imports the frames into the leaf S-VLAN. The S-VLAN bridge sends the Ethernet frames in the E-Tree service to the VSI by using the root S-VLAN or the leaf S-VLAN. One VSI corresponds to one root S-VLAN and one leaf S-VLAN. The PE device may include more than one VSI. Each VSI may correspond to one root S-VLAN and one leaf S-VLAN at the same time, where the root S-VLAN and the leaf S-VLAN that correspond to each VSI are different from each other. The PE device may also include one or multiple traditional VSIs each corresponding to only one S-VLAN, for processing traditional (non E-Tree service) VPLS Ethernet frames.

When the target CE device of the Ethernet frames is another CE device under the same local PE device, the S-VLAN bridge sends the Ethernet frames to the target CE device according to the type of the S-VLAN. For example, if the Ethernet frames are from a root S-VLAN, the S-VLAN bridge may send the Ethernet frames to a port member set in the root S-VLAN. The Ethernet frames arrive at all C-VLAN bridges associated with the E-Tree service, and the C-VLAN bridges forward the Ethernet frames to all ports related to the service according to the type of the C-VLAN (root C-VLAN). If the Ethernet frames are from a leaf S-VLAN, the S-VLAN bridge may send the Ethernet frames to a port member set in the leaf S-VLAN, or only send the Ethernet frames to the C-VLAN bridges attached with root nodes, and then the C-VLAN bridges forward the Ethernet frames to all ports associated with the E-Tree service according to the type of the C-VLAN (leaf C-VLAN). However, the leaf ports filter all Ethernet frames received from the leaf VLAN.

106. The VSI sends the Ethernet frames to a remote PE device by a pseudowire.

In VPLS network, each PE device may be connected to each other by using one set of pseudowires (Pseudo-Wire, PW) that are in full mesh or in other forms, that is, one VSI is connected to a VSI of each remote PE device by a pseudowire. The leaf VLAN and the root VLAN share the same forwarding information base (Forwarding Information Base, FIB) and share the VLAN learning. After receiving the Ethernet frames in the E-Tree service, the VSI associated with the E-Tree service searches for a corresponding egress pseudowire set according to the FIB shared by the root VLAN and the leaf VLAN, and sends the Ethernet frames to the remote PE devices by the pseudowire set. VLAN translation may be performed by the local PE device or the remote PE device. The VSI of the remote PE device sends, to the root VLAN of the remote PE device, the Ethernet frames received by the VSI of the local PE device from the root VLAN, and sends, to the leaf VLAN of the remote PE device, the Ethernet frames received by the VSI of the local PE device from the leaf VLAN. The VLAN bridge of the remote PE device then sends the Ethernet frames to the target CE device. The VLAN bridge of the remote PE device may further include a C-VLAN bridge and a S-VLAN bridge.

Frames may be encapsulated over an Ethernet pseudowire in two modes, Tagged mode or Raw mode.

When the encapsulation mode of the Ethernet pseudowire is in tagged mode, at the ingress of the pseudowire, that is, when the VSI of the local PE device sends the Ethernet frames to the pseudowire, pseudowire encapsulation is performed directly and the VLAN identifier is transparently transmitted. In this case, the remote PE device receives the Ethernet frames from the pseudowire and decapsulates the pseudowire to obtain the Ethernet frames. The obtained Ethernet frames are tagged with the VLAN identifier of the local PE device. The remote PE device replaces the VLAN identifier of the received Ethernet frames according to the VLAN identifier of the Ethernet frames and a preconfigured mapping between the VLAN identifiers of the local PE device and the VLAN identifiers of the remote PE device, that is, a mapping between the VLAN identifier of the Ethernet frames and the remote VLAN, and imports the Ethernet frames into a corresponding remote root VLAN or leaf VLAN. The above mapping between the VLAN identifiers of the local PE device and the VLAN identifiers of the remote PE device may be preconfigured by performing management configuration or by using control signaling. For example, the local PE device advertises to the remote PE device, VLANs connecting the VSI corresponding to the E-Tree service of the local PE device to its VLAN bridge and the types of the VLANs by using control signaling, that is, indicating whether a VLAN identifier belongs to the root VLAN or the leaf VLAN, so that the remote PE device establishes the mapping. The control signaling may be Label Distribution Protocol (Label Distribution Protocol, LDP) or Boarder Gateway Protocol (Boarder Gateway Protocol, BGP), or other protocols appropriate for identifier negotiation.

Optionally, when the encapsulation mode of the Ethernet pseudowire is in tagged mode, at the ingress of the pseudowire, that is, when the VSI of the local PE device sends the Ethernet frames to the pseudowire, the local PE device replaces, according to the VLAN identifier of the Ethernet frames and a preconfigured mapping between the VLAN identifiers of the local PE device and the VLAN identifiers of the remote PE device, the VLAN identifier of the Ethernet frames to be sent, that is, replacing the VLAN identifier of the Ethernet frames received from the root VLAN with the remote root VLAN identifier, and replacing the VLAN identifier of the Ethernet frames received from the leaf VLAN with the remote leaf VLAN identifier. In this way, the remote PE device does not need to perform any VLAN translation. The above mapping may be preconfigured by performing management configuration or by using control signaling. For example, the local PE device receives an advertisement of VLANs connecting the VSI of the remote PE device to its VLAN bridge and the types of the VLANs sent by the remote PE device by using control signaling, that is, indicating whether a VLAN identifier of the remote PE device belongs to the root VLAN or the leaf VLAN. The local PE device then establishes the mapping according to the advertisement.

Persons of ordinary skills in the art may understand that when the root VLANs and the leaf VLANs of the corresponding VSIs of the local and remote PE devices are consistent, no VLAN identifier replacement is required.

When the encapsulation mode of the pseudowire is in Raw mode, at the ingress of the pseudowire, that is, when the VSI of the local PE device sends the Ethernet frames to the pseudowire, the VLAN identifier is removed and then pseudowire encapsulation is performed. In this case, the remote PE device receives the Ethernet frames from the pseudowire and decapsulates the pseudowire to obtain the Ethernet frames. The obtained Ethernet frames carry no VLAN identifier. Therefore, the local PE device, during pseudowire encapsulation, sets the leaf identifier in the control word of the pseudowire according to the VLAN type of the Ethernet frames. If the removed VLAN identifier is a leaf VLAN identifier, the PE device sets the leaf identifier of the control word (for example, set it to 1); otherwise, the PE device resets the leaf identifier (for example, set it to 0). At the egress of the pseudowire, that is, when the remote PE device decapsulates the pseudowire and sends the Ethernet frames to the VSI, if the leaf identifier in the control word is set (for example, it is set to 1), the Ethernet frames are tagged with the remote leaf VLAN identifier of the remote PE device, and imported into the remote leaf VLAN; otherwise, the Ethernet frames are tagged with the remote root VLAN identifier and imported into the remote root VLAN.

Figure 2:
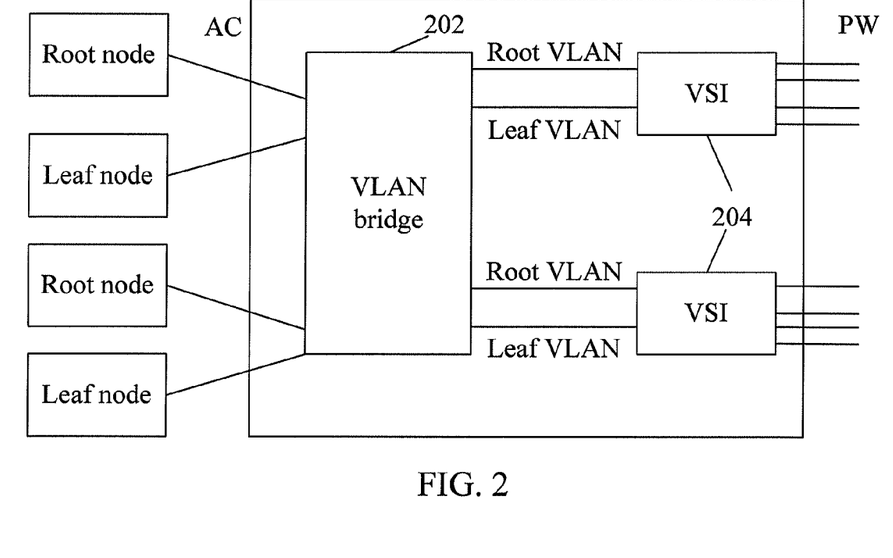
FIG. 2 is a block diagram of a PE device according to another embodiment of the present disclosure.
Figure 3:
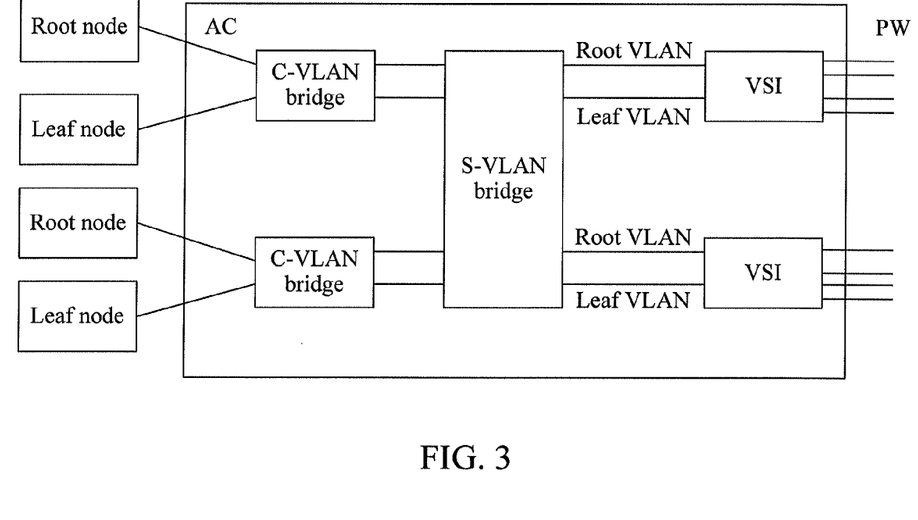
FIG. 3 is a block diagram of a PE device in a specific scenario according to an embodiment of the present disclosure.

The following describes another embodiment of the present disclosure with reference to FIG. 2 and FIG. 3.

FIG. 2 is a block diagram of a PE device according to another embodiment of the present disclosure. The PE device includes a VLAN bridge 202 and VSIs 204.

The VLAN bridge 202 is configured to receive Ethernet frames sent from a root node or a leaf node, and import the Ethernet frames into a root VLAN or a leaf VLAN according to the type of the node sending the Ethernet frames, and send the Ethernet frames to a same VSI 204. The VLAN bridge of the PE device may be a single C-VLAN bridge or S-VLAN bridge, or may be a provider bridge composed of at least one C-VLAN bridge and at least one S-VLAN.

The VLAN bridge 202 receives the Ethernet frames from the CE device. The Ethernet frames may carry tags or may carry no tag. The CE device sending the Ethernet frames may be a root node or a leaf node, and connected to the PE device by using an AC or a UNI. The PE device may determine the node type of the CE device sending the Ethernet frames, according to the attribute of the UNI that receives the Ethernet frames or other conditions. The attribute, root or leaf, of the AC or UNI is a configurable service attribute in E-Tree service.

When the type of the node is a leaf node, if the port corresponding to the AC connecting to the leaf node is in untagged mode or in priority tagged mode, the Ethernet frames received from or sent on the AC carry no tag or carry only priority tag. On the VLAN bridge port connected to the AC, a PVID is usually set to a value of the leaf VLAN. After entering the port, the Ethernet frames are tagged with a leaf VLAN identifier, that is, the Ethernet frames are imported into the leaf VLAN. The VLAN bridge port is meanwhile used as a member set (member set and untagged set) of the root VLAN. The Ethernet frames on the root VLAN which enter from other VLAN bridge ports are forwarded to the VLAN bridge port, the root VLAN tag is removed from the Ethernet frames, and then the Ethernet frames are sent out the port in untagged or priority tagged mode. If the port corresponding to the AC is in tagged mode, that is, the Ethernet frames carry a customer VLAN identifier, two translation tables, an ingress translation table and an egress translation table, are configured on the port. When the Ethernet frames enter the port, an original customer VLAN is translated into the leaf VLAN; when the Ethernet frames leave the port, the Ethernet frames with the leaf VLAN are filtered, and the root VLAN identifier of the Ethernet frames with the root VLAN is translated into the customer VLAN. In addition, when the port corresponding to the AC is in tagged mode, in addition to the C-VLAN identifier of the Ethernet frames, a leaf S-VLAN identifier may be further added, that is, the Ethernet frames are imported into the leaf S-VLAN.

For example, when the type of the node is a root node, if the port corresponding to the AC connecting to the root node is in untagged mode or in priority tagged mode, the Ethernet frames received from or sent on the AC carry no tag or carry only priority tag. On the VLAN bridge port connected to the AC, a PVID is usually set to a value of the root VLAN. After entering the port, the Ethernet frames are tagged with a root VLAN identifier, that is, the Ethernet frames are imported into the root VLAN. The VLAN bridge port is meanwhile used as a member set (member set and untagged set) of the root VLAN and leaf VLAN. The Ethernet frames on the root VLAN and leaf VLAN which enter from other VLAN bridge ports are forwarded to the VLAN bridge port, the VLAN tag is removed from the Ethernet frames, and then the Ethernet frames are sent out the port in untagged or priority tagged mode. If the port corresponding to the AC is in tagged mode, that is, the Ethernet frames carry a customer VLAN identifier, two translation tables, an ingress translation table and an egress translation table, are configured on the port. When the Ethernet frames enter the port, an original customer VLAN is translated into the root VLAN; when the Ethernet frames leave the port, the VLAN identifier of the Ethernet frames with the leaf VLAN or root VLAN which are received from other port is translated into the customer VLAN. In addition, when the port corresponding to the AC is in tagged mode, in addition to the C-VLAN identifier of the Ethernet frames, a root S-VLAN identifier may be further added, that is, the Ethernet frames are imported into the root S-VLAN.

A PE device may include multiple VSIs, each VSI supporting one or multiple E-Tree services. When one E-Tree service is supported by a VSI, the Ethernet frames sent by the root node or leaf node in the same E-Tree service are sent to the same VSI. When multiple E-Tree services access one VSI, the VLAN bridge may include multiple root VLANs and leaf VLANs, and the multiple root VLANs and leaf VLANs may access the VSI simultaneously.

The VLAN bridge of the PE device may be a single C-VLAN bridge or S-VLAN bridge, or may be a provider bridge composed of at least one C-VLAN bridge and at least one S-VLAN.

FIG. 3 is a block diagram of a PE device in a specific scenario according to an embodiment of the present disclosure. A VLAN bridge of the PE device includes a provider bridge composed of a C-VLAN bridge and a S-VLAN bridge.

In the scenario, the C-VLAN bridge of the PE device tags the Ethernet frames sent by the root node with a root C-VLAN identifier, and imports the frames into the root C-VLAN; tags the Ethernet frames sent by the leaf node with a leaf C-VLAN identifier, and imports the frames into the leaf C-VLAN. The C-VLAN bridge sends the Ethernet frames to the S-VLAN bridge by the root C-VLAN or the leaf C-VLAN. The root C-VLAN identifier and the leaf C-VLAN identifier each may be a group of sequential numbers. The root C-VLAN identifier or the leaf C-VLAN identifier is not overlapped, that is, a C-VLAN identifier may not be both the root C-VLAN identifier and the leaf C-VLAN identifier.

The S-VLAN bridge of the PE device tags the Ethernet frames from the root C-VLAN with a root S-VLAN identifier and imports the frames into the root S-VLAN; and tags the Ethernet frames from the leaf C-VLAN with a leaf C-VLAN identifier and imports the frames into the leaf S-VLAN. The S-VLAN bridge sends the Ethernet frames in the E-Tree service to a VSI 204 by the root S-VLAN or the leaf S-VLAN.

When the target CE device of the Ethernet frames is another CE device under the same local PE device, the S-VLAN bridge sends the Ethernet frames to the target CE device according to the type of the S-VLAN. For example, if the Ethernet frames are from a root S-VLAN, the S-VLAN bridge may send the Ethernet frames to a port member set in the root S-VLAN. The Ethernet frames arrive at all C-VLAN bridges associated with the E-Tree service, and the C-VLAN bridges forward the Ethernet frames to all ports associated with the service according to the type of the C-VLAN (root C-VLAN). If the Ethernet frames are from a leaf S-VLAN, the S-VLAN bridge may send the Ethernet frames to a port member set in the leaf S-VLAN or only send the Ethernet frames to the C-VLAN bridges associated with root nodes, and then the C-VLAN bridges forward the Ethernet frames to all ports associated with the E-Tree service according to the type of the C-VLAN (leaf C-VLAN). However, the leaf ports filter all Ethernet frames sent over the leaf VLAN.

The VSI 204, is connected to the VLAN bridge 202 by at least one root VLAN and at least one leaf VLAN. The VSI 204 is configured to send the Ethernet frames to a remote PE device by a pseudowire.

One VSI 204 corresponds to one root VLAN and one leaf VLAN. A PE device may include more than one VSI 204. Each VSI 204 may correspond to one root VLAN and one leaf VLAN, where the root VLAN and the leaf VLAN that correspond to each VSI are different from each other. The PE device may also include one traditional VSI 204 corresponding to only one VLAN, for processing VPLS Ethernet frames from non E-Tree service. The leaf VLAN and the root VLAN share the same FIB and share the VLAN learning.

After receiving the Ethernet frames in the E-Tree service, the VSI 204 associated with the E-Tree service searches for a corresponding egress pseudowire set according to the FIB shared by the root VLAN and the leaf VLAN, and sends the Ethernet frames to the remote PE device by the pseudowire set. VLAN translation may further be performed. The VSI of the remote PE device sends to the root VLAN of the remote PE device, the Ethernet frames received by the VSI 204 of the local PE device from the root VLAN, and sends to the leaf VLAN of the remote PE device, the Ethernet frames received by the VSI 204 of the local PE device from the leaf VLAN. The VLAN bridge of the remote PE device then sends the Ethernet frames to the target CE device. The VSI 204 is connected to a VSI 204 of each remote PE device by a pseudowire (Pseudo-Wire, PW).

Frames may be encapsulated over an Ethernet pseudowire in two modes, Tagged mode and Raw mode.

When the encapsulation mode of the Ethernet pseudowire is in tagged mode, the VSI 204 is further configured to directly perform the pseudowire encapsulation and transparently transmit the VLAN identifier, at the ingress of the pseudowire, that is, when the VSI 204 of the local PE device sends the Ethernet frames to the pseudowire. In this case, the remote PE device receives the Ethernet frames from the pseudowire and decapsulates the pseudowire to obtain the Ethernet frames. The obtained Ethernet frames are tagged with the VLAN identifier of the local PE device. The remote PE device replaces the VLAN identifier of the received Ethernet frames, according to the VLAN identifier of the Ethernet frames and a preconfigured mapping between the VLAN identifiers of the local PE device and the VLAN identifiers of the remote PE device, that is, a mapping between the VLAN identifier of the Ethernet frames and the remote VLAN, and imports the Ethernet frames into a corresponding remote root VLAN or leaf VLAN.

The above mapping may be preconfigured by performing management configuration or by using control signaling. When the mapping is configured by using control signaling, the PE device further includes an advertising module, configured to advertise to the remote PE device, VLANs connecting the VSI 204 to the VLAN bridge 202 and the types of the VLANs by using control signaling, so that the remote PE device establishes the preconfigured mapping between the VLAN identifiers of the Ethernet frames and the remote VLANs. The advertising module of the local PE device advertises to the remote PE device, VLANs connecting the VSI 204 to the VLAN bridge 202 and the types of the VLANs by using control signaling, that is, indicating whether a VLAN identifier belongs to the root VLAN or the leaf VLAN, so that the remote PE device establishes the mapping. The control signaling may be Label Distribution Protocol (Label Distribution Protocol, LDP) or Boarder Gateway Protocol (Boarder Gateway Protocol, BGP), or other appropriate protocols for identifier negotiation.

Optionally, when the encapsulation mode of the Ethernet pseudowire is in tagged mode, the VSI 204 is further configured to, at the ingress of the pseudowire, that is, when the VSI of the local PE device sends the Ethernet frames to the pseudowire, replace, according to the VLAN identifier of the Ethernet frames and a preconfigured mapping between the VLAN identifiers of the local PE device and the VLAN identifiers of the remote PE device, the VLAN identifier of the Ethernet frames to be sent, that is, replacing the VLAN identifier of the Ethernet frames received from the root VLAN with the remote root VLAN identifier, and replacing the VLAN identifier of the Ethernet frames received from the leaf VLAN with the remote leaf VLAN identifier. In this way, the remote PE device does not need to perform any VLAN translation. The above mapping may be preconfigured by performing management configuration or by using control signaling. When the mapping is configured by using the control signaling, the PE device may further include a receiving module, configured to receive VLANs connecting the VSI of the remote PE device to the VLAN bridge and the types of the VLANs that are advertised by the remote PE device by using control signaling, that is, indicating whether a VLAN identifier of the remote PE device corresponds to the root VLAN or the leaf VLAN, and establish the mapping according to the advertisement.

Persons of ordinary skills in the art may understand that when the root VLANs and the leaf VLANs of the corresponding VSIs of the local and remote PE devices are consistent, no VLAN identifier replacement is required.

When the encapsulation mode of the pseudowire is in Raw mode, the PE device, at the ingress of the pseudowire, that is, when the VSI 204 of the local PE device sends the Ethernet frames to the pseudowire, removes the VLAN identifier and then performs pseudowire encapsulation. The remote PE device receives the Ethernet frames from the pseudowire and decapsulates the pseudowire to obtain the Ethernet frames. The obtained Ethernet frames carry no VLAN identifier. In this case, the local PE device further includes a setting module, configured to set a leaf identifier in a control word of the pseudowire according to the type of the VLAN of the Ethernet frames, so that the remote PE device imports the Ethernet frames into a corresponding root VLAN or leaf VLAN according to the leaf identifier. Therefore, the setting module, when the local PE device performs pseudowire encapsulation, sets the leaf identifier in the control word of the pseudowire according to the VLAN type of the Ethernet frames. If the removed VLAN identifier is a leaf VLAN identifier, the PE device sets the leaf identifier of the control word (for example, set it to 1); otherwise, the PE device resets the leaf identifier (for example, set it to 0). At the egress of the pseudowire, that is, when the remote PE device decapsulates the pseudowire and sends the Ethernet frames to the VSI 204, if the leaf identifier in the control word is set (for example, it is set to 1), the Ethernet frames are tagged with the remote leaf VLAN identifier of the remote PE device, and imported into the remote leaf VLAN; otherwise, the Ethernet frames are tagged with the remote root VLAN identifier and imported into the remote root VLAN.

Figure 4:
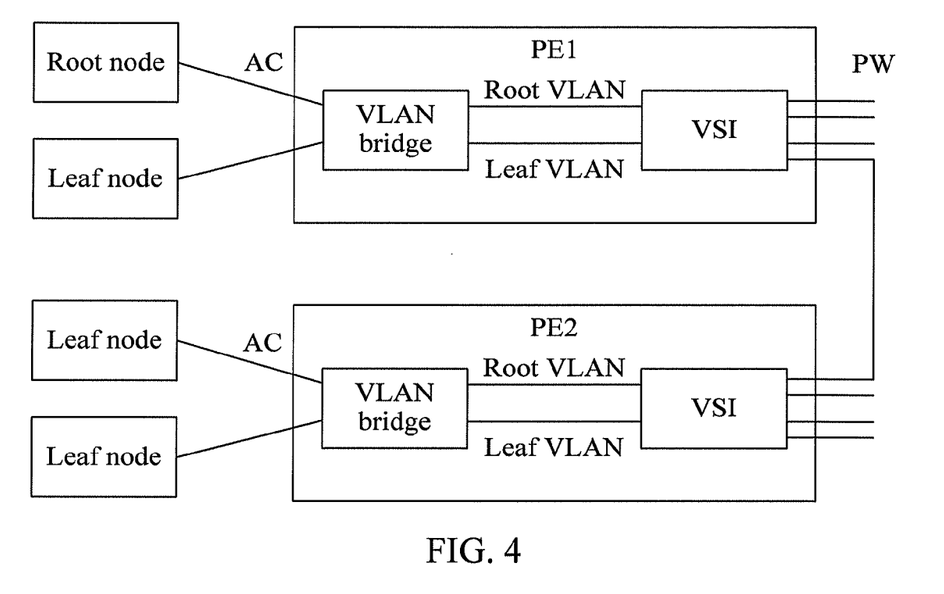
FIG. 4 is a schematic diagram of another specific scenario according to an embodiment of the present disclosure.

The following describes another specific scenario according to an embodiment of the present disclosure with reference to FIG. 4.

FIG. 4 is a schematic diagram of another specific scenario according to an embodiment of the present disclosure. In the specific scenario, two PE devices supporting the E-Tree service are connected by an Ethernet pseudowire.

In this scenario, one PE device, PE 1, is attached with CE devices of both root nodes and leaf nodes in a hybrid mode, whereas the other PE device, PE 2, is attached with CE devices of pure leaf nodes. In this scenario, some optimization measures may be taken to reduce the bandwidth consumed by the pseudowire. For example, PE 1 can know that PE 2 is attached with a set of pure leaf nodes by performing management configuration or by using control signaling. In this case, since the leaf nodes cannot communicate with each other and are isolated with each other, the VSI of PE 1 may directly discards the Ethernet frames received from the leaf VLAN at the ingress of a PW when PE 1 sends the Ethernet frames over the pseudowire, instead of sending the Ethernet frames to an MPLS network. In this way, the network bandwidth consumed is reduced. Furthermore, with respect to the Ethernet frames received from the pseudowire connected to PE 1, the VSI of PE 2 need not identify the VLAN type (no matter in Tagged mode or in Raw mode), but directly tags the received Ethernet frames with the remote root VLAN and imports the Ethernet frames into the remote root VLAN.

Figure 5:
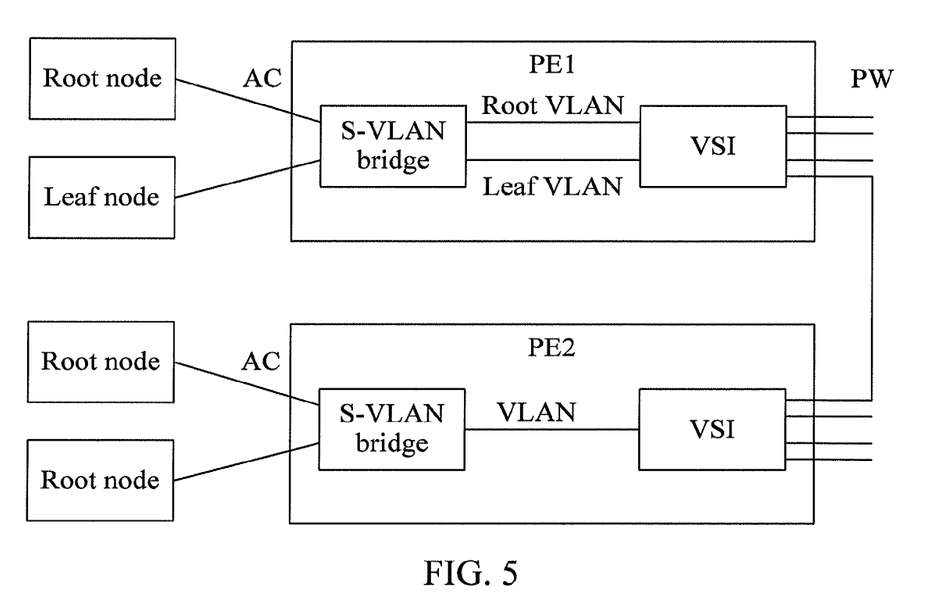
FIG. 5 is a schematic diagram of still another specific scenario according to an embodiment of the present disclosure.

The following describes still another specific scenario according to an embodiment of the present disclosure with reference to FIG. 5.

FIG. 5 is a schematic diagram of still another specific scenario according to an embodiment of the present disclosure. In the specific scenario, one PE device, PE 1, supporting the E-Tree service and one PE device, PE 2, not supporting the E-Tree service are connected by a pseudowire.

When PE 1 sends Ethernet frames in the E-Tree service, if the encapsulation mode of the pseudowire is in tagged mode, the VSI does not modify the Ethernet frames received from the root VLAN, but replaces the VLAN identifier of the Ethernet frames received from the leaf VLAN with the VLAN identifier of the root VLAN corresponding to the VSI, and then performs pseudowire encapsulation. When the encapsulation mode of the pseudowire is in Raw mode, the leaf identifier in the control word of the pseudowire is not set. The VLAN identifier is removed directly and then pseudowire encapsulation is performed. Furthermore, PE 1 may directly replace the VLAN identifier of the Ethernet frames received from the root VLAN and the leaf VLAN with the remote VLAN identifier. In this way, the remote PE device does not need to perform any VLAN translation. When the Ethernet frames are received, if the encapsulation mode of the pseudowire is in tagged mode, PE 1 translates the VLAN of the Ethernet frames into the remote root VLAN; if the encapsulation mode of the pseudowire is in Raw mode, PE 1 tags the Ethernet frames with the remote root VLAN identifier and imports the Ethernet frames into the remote root VLAN.

PE 2 still works in the original VPLS mode, that is, the Ethernet frames from all nodes accessing the same E-Tree are communicated to the VSI through a single VLAN after passing through the VLAN bridge, and then the VSI is connected to the remote PE device by a pseudowire. The Ethernet frames are received or sent over the same VLAN (that is, all the frames corresponding to the E-Tree service carry the same VLAN tag). When the PW is in tagged mode, the PW needs to carry the remote VLAN tag; otherwise, when the PW is in Raw mode, the PW does not carry the VLAN tag, and the leaf identifier in the control word of the pseudowire does not need to be set.

In this scenario, the two PE devices negotiate about whether the connected pseudowire has the capability of supporting the E-Tree mechanism by using control signaling, for example, the LDP protocol. If one PE device in the VPLS does not support the E-Tree mechanism described in the embodiments of the present disclosure, all the CE devices under the PE device not supporting the E-Tree service access as root nodes, and PE 2 needs no modification. Therefore, the PE device according to the embodiments of the present disclosure can be compatible with the current PE device.

With the solution provided in the embodiments of the present disclosure, a VLAN is associated with the type of an E-Tree node sending Ethernet frames, pseudowire encapsulation for the E-Tree service is performed according to the pseudowire encapsulation mode, a valid isolation between the E-Tree leaf nodes is accomplished, and the VSI is connected to the VLAN bridge by at least one root VLAN and at least one leaf VLAN, and the PE devices at the two ends of the PW negotiates the supported capability of the E-Tree service by using control signaling. In this way, one or multiple E-Tree services can be supported by using a single VPLS instance, ensuring the original scalability of the VPLS and a compatibility with the current PE device.

It is understandable to those skilled in the art that all or part steps of the preceding steps can be implemented by hardware following instructions of programs. The programs may be stored in a computer readable storage medium. The storage medium may be a ROM/RAM, a magnetic disk, or a compact disc-read only memory.

In conclusion, the above are merely exemplary embodiments of the present disclosure. The scope of the present disclosure is not limited thereto. Variations or replacements readily apparent to persons skilled in the prior art within the technical scope of the present disclosure should fall within the protection scope of the present disclosure. Therefore, the protection scope of the present disclosure is subjected to the claims.

What is claimed is:

1. A method for sending Ethernet frames in an Ethernet Tree service, comprising:
   receiving, by a virtual local area network (VLAN) bridge, Ethernet frames sent by a root node or a leaf node;
   importing, by the VLAN bridge, the Ethernet frames into at least one root VLAN or at least one leaf VLAN according to a type of the node sending the Ethernet frames, and sending the Ethernet frames to a same virtual switching instance (VSI), wherein the VSI is connected to the VLAN bridge by the at least one root VLAN and the at least one leaf VLAN and the VLAN bridge, the at least one root VLAN, the at least one leaf VLAN and the VSI are included in a provider edge (PE) device; and
   sending, by the VSI, the Ethernet frames to a corresponding remote PE device by a pseudowire.

2. The method according to claim 1, wherein when an encapsulation mode of the pseudowire is in Tagged mode, before sending, by the VSI, the Ethernet frames to the corresponding remote PE device by the pseudowire, the method further comprises:
   replacing a VLAN identifier of the Ethernet frames with a root VLAN identifier or a leaf VLAN identifier of the corresponding remote PE device according to the VLAN identifier of the Ethernet frames and a preconfigured mapping between VLAN identifiers of the Ethernet frames and VLAN identifiers of the remote PE device.

3. The method according to claim 2, further comprising:
   receiving remote VLANs connecting VSI of the remote PE device to VLAN bridge of the remote PE device and types of the remote VLANs that are advertised by the remote PE device by using control signaling, and configuring the mapping between the VLAN identifiers of the Ethernet frames and the VLAN identifiers of the remote PE device.

4. The method according to claim 2 wherein when all nodes connected to the remote PE device are leaf nodes, before sending, by the VSI, the Ethernet frames to the corresponding remote PE device by the pseudowire, the method further comprises:

discarding all Ethernet frames from the leaf VLAN.

5. The method according to claim 4, wherein importing, by the VLAN bridge, the Ethernet frames into the at least one root VLAN or the at least one leaf VLAN according to the type of the node sending the Ethernet frames comprises:

importing, by the VLAN bridge, the Ethernet frames received from the root node into the at least one root VLAN, and importing the Ethernet frames received from the leaf node into the at least one leaf VLAN.

6. The method according to claim 1, wherein when an encapsulation mode of the pseudowire is in Tagged mode, the method further comprises:

importing, by the remote PE device, the Ethernet frames into a corresponding remote root VLAN or leaf VLAN according to VLAN identifier of the Ethernet frames and a preconfigured mapping between VLAN identifiers of the Ethernet frames and remote VLANs.

7. The method according to claim 6, further comprising:

advertising the VLANs connecting the VSI to the VLAN bridge and the types of the VLANs to the remote PE device by using control signaling, so that the remote PE device configures the mapping between the VLAN identifiers of the Ethernet frames and the remote VLANs.

8. The method according to claim 6, wherein when all nodes connected to the remote PE device are leaf nodes, before sending, by the VSI, the Ethernet frames to the corresponding remote PE device by the pseudowire, the method further comprises:

discarding all Ethernet frames from the leaf VLAN.

9. The method according to claim 8, wherein the importing, by the VLAN bridge, the Ethernet frames into the at least one root VLAN or the at least one leaf VLAN according to the type of the node sending the Ethernet frames comprises:

importing, by the VLAN bridge, the Ethernet frames received from the root node into the at least one root VLAN, and importing the Ethernet frames received from the leaf node into the at least one leaf VLAN.

10. The method according to claim 1, wherein when an encapsulation mode of the pseudowire is in Raw mode, the method further comprises:

when the Ethernet frames are sent by the pseudowire, setting a leaf identifier in a control word of the pseudowire according to the type of the VLAN of the Ethernet frames, so that the remote PE device imports the Ethernet frames into a corresponding remote root VLAN or remote leaf VLAN according to the leaf identifier.

11. The method according to claim 10, wherein importing, by the VLAN bridge, the Ethernet frames into the at least one root VLAN or the at least one leaf VLAN according to the type of the node sending the Ethernet frames comprises:

importing, by the VLAN bridge, the Ethernet frames received from the root node into the at least one root VLAN, and importing the Ethernet frames received from the leaf node into the at least one leaf VLAN.

12. The method according to claim 11, wherein importing, by the VLAN bridge, the Ethernet frames into the at least one root VLAN or the at least one leaf VLAN according to the type of the node sending the Ethernet frames comprises:

importing, by the VLAN bridge, the Ethernet frames received from the root node into the at least one root VLAN, and importing the Ethernet frames received from the leaf node into the at least one leaf VLAN.

13. The method according to claim 1, wherein when all nodes connected to the remote PE device are leaf nodes, before sending, by the VSI, the Ethernet frames to the corresponding remote PE device by the pseudowire, the method further comprises:

discarding all Ethernet frames from the leaf VLAN.

14. The method according to claim 1, wherein importing, by the VLAN bridge, the Ethernet frames into the at least one root VLAN or the at least one leaf VLAN according to the type of the node sending the Ethernet frames comprises:

importing, by the VLAN bridge, the Ethernet frames received from the root node into the at least one root VLAN, and importing the Ethernet frames received from the leaf node into the at least one leaf VLAN.

15. A provider edge (PE) device, comprising a virtual local area network (VLAN) bridge and a virtual switching instance (VSI), wherein the VLAN bridge is configured to receive Ethernet frames from a root node or a leaf node, import the Ethernet frames into at least one root VLAN or at least one leaf VLAN according to a type of the node sending the Ethernet frames, and send the Ethernet frames to a same VSI, wherein the at least one root VLAN and the at least one leaf VLAN are included in the PE device; and the VSI, connected to the VLAN bridge by the at least one root VLAN and the at least one leaf VLAN, is configured to send the Ethernet frames to a corresponding remote PE device by a pseudowire.

16. The PE device according to claim 15, wherein when an encapsulation mode of the pseudowire is in Tagged mode, the VSI is further configured to replace a VLAN identifier of the Ethernet frames with a root VLAN identifier or a leaf VLAN identifier of the corresponding remote PE device according to the VLAN identifier of the Ethernet frames and a preconfigured mapping between VLAN identifiers of the Ethernet frames and VLAN identifiers of the remote PE device.

17. The PE device according to claim 16, further comprising a receiving module; wherein the receiving module is configured to receive remote VLANs connecting VSI of the remote PE device to VLAN bridge of the remote PE device and types of the remote VLANs that are advertised by the remote PE by using control signaling, and configure the mapping between VLAN identifiers of the Ethernet frames and VLAN identifiers of the remote PE device.

18. The PE device according claim 17, wherein when all nodes connected to the remote PE device are leaf nodes, the VSI is further configured to discard all Ethernet frames from the leaf VLAN.

19. The PE device according to claim 15, wherein when an encapsulation mode of the pseudowire is in Tagged mode, the VSI is further configured to enable the remote PE device to import the Ethernet frames into a corresponding remote root VLAN or leaf VLAN according to VLAN identifier of the Ethernet frames and a preconfigured mapping between VLAN identifiers of the Ethernet frames and remote VLANs.

20. The PE device according to claim 19, further comprising an advertising module; wherein the advertising module is configured to advertise VLANs connecting the VSI to the VLAN bridge and the types of the VLANs to the remote PE device by using control signaling, so that the remote PE device configures the mapping between VLAN identifiers of the Ethernet frames and the remote VLANs.

21. The PE device according claim 20, wherein when all nodes connected to the remote PE device are leaf nodes, the VSI is further configured to discard all Ethernet frames from the at least one leaf VLAN.

22. The PE device according to claim 15 wherein when an encapsulation mode of the pseudowire is in Raw mode, the PE device further comprises a setting module; wherein the setting module is configured to set a leaf identifier in a control word of the pseudowire according to the type of the VLAN of the Ethernet frames, so that the remote PE device imports the Ethernet frames into a corresponding remote root VLAN or a corresponding remote leaf VLAN according to the leaf identifier.

23. The PE device according claim 22, wherein when all nodes connected to the remote PE device are leaf nodes, the VSI is further configured to discard all Ethernet frames from the at least one leaf VLAN.

24. The PE device according claim 15, wherein when all nodes connected to the remote PE device are leaf nodes, the VSI is further configured to discard all Ethernet frames from the at least one leaf VLAN.

* * * * *